(12) United States Patent
Bell et al.

(10) Patent No.: US 8,487,866 B2
(45) Date of Patent: Jul. 16, 2013

(54) METHOD AND SYSTEM FOR MANAGING AN INTERACTIVE VIDEO DISPLAY SYSTEM

(75) Inventors: Matthew Bell, Palo Alto, CA (US); Russell H. Belfer, Burlingame, CA (US)

(73) Assignee: Intellectual Ventures Holding 67 LLC, Las Vegas, NV (US)

( * ) Notice: Subject to any disclaimer, the term of this patent is extended or adjusted under 35 U.S.C. 154(b) by 1118 days.

(21) Appl. No.: 12/417,588

(22) Filed: Apr. 2, 2009

(65) Prior Publication Data

US 2009/0235295 A1    Sep. 17, 2009

Related U.S. Application Data

(63) Continuation of application No. 10/973,335, filed on Oct. 25, 2004, now abandoned.

(60) Provisional application No. 60/514,232, filed on Oct. 24, 2003.

(51) Int. Cl.
*G09G 5/00* (2006.01)

(52) U.S. Cl.
USPC ............... 345/156; 705/14.41; 705/14.49; 725/9; 725/10

(58) Field of Classification Search
USPC ............ 345/156, 204; 705/14.41, 14.43, 705/14.44, 45.45, 14.49, 14.5, 14.52, 14.53, 705/14.58, 14.66, 14.67; 725/9, 10
See application file for complete search history.

(56) References Cited

U.S. PATENT DOCUMENTS

| | | | |
|---|---|---|---|
| 2,917,980 A | 12/1959 | Grube et al. | |
| 3,068,754 A | 12/1962 | Benjamin et al. | |
| 3,763,468 A | 10/1973 | Ovshinsky et al. | |
| 4,053,208 A | 10/1977 | Kato et al. | |
| 4,275,395 A | 6/1981 | Dewey et al. | |
| 4,573,191 A | 2/1986 | Kidode et al. | |
| 4,725,863 A | 2/1988 | Dumbreck et al. | |
| 4,769,697 A * | 9/1988 | Gilley et al. | 725/12 |
| 4,791,572 A | 12/1988 | Green et al. | |
| 4,843,568 A * | 6/1989 | Krueger et al. | 382/100 |
| 4,887,898 A | 12/1989 | Halliburton et al. | |

(Continued)

FOREIGN PATENT DOCUMENTS

EP    0 055 366 A2    7/1982
EP    0 626 636 A2    11/1994

(Continued)

OTHER PUBLICATIONS

International Preliminary Report on Patentability for PCT/US2008/10750, filed Sep. 15, 2008.

(Continued)

*Primary Examiner* — Koosha Sharifi-Tafreshi
(74) *Attorney, Agent, or Firm* — Knobbe Martens Olson & Bear, LLP (57) ABSTRACT

A method for managing an interactive video display system. A plurality of video spots are displayed on the interactive video display system. Data based on interaction with the interactive video display system corresponding to video spots of the plurality of video spots is gathered. The data is stored, wherein the data is for use in managing presentation of the video spots. By analyzing data relating to different video spots, popularity and other metrics may be determined for the video spots, providing useful information for managing the presentation of the video spots.

33 Claims, 3 Drawing Sheets

U.S. PATENT DOCUMENTS

| | | | |
|---|---|---|---|
| 4,948,371 A | 8/1990 | Hall | |
| 5,001,558 A | 3/1991 | Burley et al. | |
| 5,138,304 A | 8/1992 | Bronson | |
| 5,151,718 A | 9/1992 | Nelson | |
| 5,239,373 A | 8/1993 | Tang et al. | |
| 5,276,609 A | 1/1994 | Durlach | |
| 5,319,496 A | 6/1994 | Jewell et al. | |
| 5,325,472 A | 6/1994 | Horiuchi et al. | |
| 5,325,473 A | 6/1994 | Monroe et al. | |
| 5,426,474 A | 6/1995 | Rubtsov et al. | |
| 5,436,639 A | 7/1995 | Arai et al. | |
| 5,442,252 A | 8/1995 | Golz | |
| 5,454,043 A | 9/1995 | Freeman | |
| 5,497,269 A | 3/1996 | Gal | |
| 5,510,828 A | 4/1996 | Lutterbach et al. | |
| 5,526,182 A | 6/1996 | Jewell et al. | |
| 5,528,263 A | 6/1996 | Platzker et al. | |
| 5,528,297 A | 6/1996 | Seegert et al. | |
| 5,534,917 A | 7/1996 | MacDougall | |
| 5,548,694 A | 8/1996 | Gibson | |
| 5,591,972 A | 1/1997 | Noble et al. | |
| 5,594,469 A | 1/1997 | Freeman et al. | |
| 5,633,691 A | 5/1997 | Vogeley et al. | |
| 5,703,637 A | 12/1997 | Miyazaki et al. | |
| 5,771,307 A * | 6/1998 | Lu et al. | 382/116 |
| 5,808,784 A | 9/1998 | Ando et al. | |
| 5,846,086 A | 12/1998 | Bizzi et al. | |
| 5,861,881 A | 1/1999 | Freeman et al. | |
| 5,882,204 A | 3/1999 | Iannazo et al. | |
| 5,923,380 A | 7/1999 | Yang et al. | |
| 5,923,475 A | 7/1999 | Kurtz et al. | |
| 5,953,152 A | 9/1999 | Hewlett | |
| 5,966,696 A * | 10/1999 | Giraud | 705/14.41 |
| 5,969,754 A | 10/1999 | Zeman | |
| 5,978,136 A | 11/1999 | Ogawa et al. | |
| 5,982,352 A | 11/1999 | Pryor | |
| 6,008,800 A | 12/1999 | Pryor | |
| 6,058,397 A | 5/2000 | Barrus et al. | |
| 6,075,895 A | 6/2000 | Qiao et al. | |
| 6,084,979 A | 7/2000 | Kanada et al. | |
| 6,088,612 A | 7/2000 | Blair | |
| 6,097,369 A | 8/2000 | Wambach | |
| 6,106,119 A | 8/2000 | Edwards | |
| 6,118,888 A | 9/2000 | Chino et al. | |
| 6,125,198 A | 9/2000 | Onda | |
| 6,166,744 A | 12/2000 | Jaszlics et al. | |
| 6,176,782 B1 | 1/2001 | Lyons et al. | |
| 6,191,773 B1 | 2/2001 | Maruno et al. | |
| 6,198,487 B1 | 3/2001 | Fortenbery et al. | |
| 6,198,844 B1 | 3/2001 | Nomura | |
| 6,217,449 B1 | 4/2001 | Kaku | |
| 6,263,339 B1 | 7/2001 | Hirsch | |
| 6,270,403 B1 | 8/2001 | Watanabe et al. | |
| 6,278,418 B1 | 8/2001 | Doi | |
| 6,292,171 B1 | 9/2001 | Fu et al. | |
| 6,304,267 B1 | 10/2001 | Sata | |
| 6,308,565 B1 | 10/2001 | French et al. | |
| 6,323,895 B1 | 11/2001 | Sata | |
| 6,333,735 B1 | 12/2001 | Anvekar | |
| 6,335,977 B1 | 1/2002 | Kage | |
| 6,339,748 B1 | 1/2002 | Hiramatsu | |
| 6,349,301 B1 | 2/2002 | Mitchell et al. | |
| 6,353,428 B1 | 3/2002 | Maggioni et al. | |
| 6,359,612 B1 | 3/2002 | Peter et al. | |
| 6,388,657 B1 | 5/2002 | Natoli | |
| 6,394,896 B2 | 5/2002 | Sugimoto | |
| 6,400,374 B2 | 6/2002 | Lanier | |
| 6,407,870 B1 | 6/2002 | Hurevich et al. | |
| 6,414,672 B2 | 7/2002 | Rekimoto et al. | |
| 6,445,815 B1 | 9/2002 | Sato | |
| 6,454,419 B2 | 9/2002 | Kitazawa | |
| 6,480,267 B2 | 11/2002 | Yanagi et al. | |
| 6,491,396 B2 | 12/2002 | Karasawa et al. | |
| 6,501,515 B1 | 12/2002 | Iwamura | |
| 6,522,312 B2 | 2/2003 | Ohshima et al. | |
| 6,545,706 B1 | 4/2003 | Edwards et al. | |
| 6,552,760 B1 | 4/2003 | Gotoh et al. | |
| 6,598,978 B2 | 7/2003 | Hasegawa | |
| 6,607,275 B1 | 8/2003 | Cimini et al. | |
| 6,611,241 B1 | 8/2003 | Firester et al. | |
| 6,654,734 B1 | 11/2003 | Mani et al. | |
| 6,658,150 B2 | 12/2003 | Tsuji et al. | |
| 6,661,918 B1 | 12/2003 | Gordon et al. | |
| 6,677,969 B1 | 1/2004 | Hongo | |
| 6,707,054 B2 | 3/2004 | Ray | |
| 6,707,444 B1 | 3/2004 | Hendriks et al. | |
| 6,712,476 B1 | 3/2004 | Ito et al. | |
| 6,720,949 B1 | 4/2004 | Pryor et al. | |
| 6,732,929 B2 | 5/2004 | Good et al. | |
| 6,747,666 B2 | 6/2004 | Utterback | |
| 6,752,720 B1 | 6/2004 | Clapper et al. | |
| 6,754,370 B1 | 6/2004 | Hall-Holt et al. | |
| 6,791,700 B2 | 9/2004 | Omura et al. | |
| 6,808,293 B2 | 10/2004 | Watanabe et al. | |
| 6,826,727 B1 | 11/2004 | Mohr et al. | |
| 6,831,664 B2 | 12/2004 | Marmaropoulos et al. | |
| 6,871,982 B2 | 3/2005 | Holman et al. | |
| 6,877,882 B1 | 4/2005 | Haven et al. | |
| 6,912,313 B2 | 6/2005 | Li | |
| 6,965,693 B1 | 11/2005 | Kondo et al. | |
| 6,975,360 B2 | 12/2005 | Slatter | |
| 6,999,600 B2 | 2/2006 | Venetianer | |
| 7,000,200 B1 | 2/2006 | Martins | |
| 7,015,894 B2 | 3/2006 | Morohoshi | |
| 7,042,440 B2 | 5/2006 | Pryor | |
| 7,054,068 B2 | 5/2006 | Yoshida et al. | |
| 7,058,204 B2 | 6/2006 | Hildreth et al. | |
| 7,068,274 B2 | 6/2006 | Welch et al. | |
| 7,069,516 B2 | 6/2006 | Rekimoto | |
| 7,084,859 B1 | 8/2006 | Pryor et al. | |
| 7,088,508 B2 | 8/2006 | Ebina et al. | |
| 7,129,927 B2 | 10/2006 | Mattsson | |
| 7,149,262 B1 | 12/2006 | Nayar et al. | |
| 7,158,676 B1 | 1/2007 | Rainsford | |
| 7,170,492 B2 | 1/2007 | Bell | |
| 7,190,832 B2 | 3/2007 | Frost et al. | |
| 7,193,608 B2 | 3/2007 | Stuerzlinger | |
| 7,227,526 B2 | 6/2007 | Hildreth et al. | |
| 7,259,747 B2 | 8/2007 | Bell | |
| 7,262,874 B2 | 8/2007 | Suzuki | |
| 7,268,950 B2 | 9/2007 | Poulsen | |
| 7,289,130 B1 | 10/2007 | Satoh et al. | |
| 7,330,584 B2 | 2/2008 | Weiguo et al. | |
| 7,331,856 B1 | 2/2008 | Nakamura et al. | |
| 7,339,521 B2 | 3/2008 | Scheidemann et al. | |
| 7,348,963 B2 | 3/2008 | Bell | |
| 7,379,563 B2 | 5/2008 | Shamaie | |
| 7,382,897 B2 | 6/2008 | Brown et al. | |
| 7,394,459 B2 | 7/2008 | Bathiche et al. | |
| 7,428,542 B1 | 9/2008 | Fink et al. | |
| 7,431,253 B2 | 10/2008 | Yeh | |
| 7,432,917 B2 | 10/2008 | Wilson et al. | |
| 7,468,742 B2 | 12/2008 | Ahn et al. | |
| 7,536,032 B2 | 5/2009 | Bell | |
| 7,559,841 B2 | 7/2009 | Hashimoto | |
| 7,576,727 B2 | 8/2009 | Bell | |
| 7,598,942 B2 | 10/2009 | Underkoffler et al. | |
| 7,619,824 B2 | 11/2009 | Poulsen | |
| 7,665,041 B2 | 2/2010 | Wilson et al. | |
| 7,710,391 B2 | 5/2010 | Bell et al. | |
| 7,728,280 B2 | 6/2010 | Feilkas et al. | |
| 7,737,636 B2 | 6/2010 | Li et al. | |
| 7,745,771 B2 | 6/2010 | Troxell et al. | |
| RE41,685 E | 9/2010 | Feldman et al. | |
| 7,809,167 B2 | 10/2010 | Bell | |
| 7,834,846 B1 | 11/2010 | Bell | |
| 7,961,906 B2 | 6/2011 | Ruedin | |
| 7,971,156 B2 | 6/2011 | Albertson et al. | |
| 8,035,612 B2 | 10/2011 | Bell et al. | |
| 8,035,624 B2 | 10/2011 | Bell et al. | |
| 8,081,822 B1 | 12/2011 | Bell | |
| 8,085,293 B2 | 12/2011 | Brodsky et al. | |
| 8,085,994 B2 | 12/2011 | Kim | |
| 8,098,277 B1 | 1/2012 | Bell | |
| 8,159,682 B2 | 4/2012 | Bell | |
| 8,199,108 B2 | 6/2012 | Bell et al. | |
| 8,230,367 B2 | 7/2012 | Bell et al. | |

| | | |
|---|---|---|
| 8,259,163 B2 | 9/2012 | Bell et al. |
| 2001/0012001 A1 | 8/2001 | Rekimoto et al. |
| 2001/0033675 A1 | 10/2001 | Maurer et al. |
| 2002/0006583 A1 | 1/2002 | Michiels et al. |
| 2002/0032697 A1 | 3/2002 | French et al. |
| 2002/0041327 A1 | 4/2002 | Hildreth et al. |
| 2002/0046100 A1* | 4/2002 | Kinjo ............................ 705/14 |
| 2002/0064382 A1 | 5/2002 | Hildreth et al. |
| 2002/0073417 A1* | 6/2002 | Kondo et al. ................... 725/10 |
| 2002/0078441 A1* | 6/2002 | Drake et al. .................... 725/9 |
| 2002/0081032 A1 | 6/2002 | Chen et al. |
| 2002/0103617 A1 | 8/2002 | Uchiyama et al. |
| 2002/0105623 A1 | 8/2002 | Pinhanez |
| 2002/0130839 A1 | 9/2002 | Wallace et al. |
| 2002/0140633 A1 | 10/2002 | Rafii et al. |
| 2002/0140682 A1 | 10/2002 | Brown et al. |
| 2002/0178440 A1 | 11/2002 | Agnihotri et al. |
| 2002/0186221 A1 | 12/2002 | Bell |
| 2003/0032484 A1 | 2/2003 | Ohshima et al. |
| 2003/0065563 A1* | 4/2003 | Elliott et al. .................... 705/14 |
| 2003/0091724 A1 | 5/2003 | Mizoguchi |
| 2003/0093784 A1 | 5/2003 | Dimitrova et al. |
| 2003/0098819 A1 | 5/2003 | Sukthankar et al. |
| 2003/0103030 A1 | 6/2003 | Wu |
| 2003/0113018 A1 | 6/2003 | Nefian et al. |
| 2003/0122839 A1 | 7/2003 | Matraszek et al. |
| 2003/0126013 A1* | 7/2003 | Shand ............................ 705/14 |
| 2003/0137494 A1 | 7/2003 | Tulbert |
| 2003/0161502 A1 | 8/2003 | Morihara et al. |
| 2003/0178549 A1 | 9/2003 | Ray |
| 2004/0005924 A1 | 1/2004 | Watabe et al. |
| 2004/0015783 A1 | 1/2004 | Lennon et al. |
| 2004/0046736 A1 | 3/2004 | Pryor et al. |
| 2004/0046744 A1 | 3/2004 | Rafii et al. |
| 2004/0073541 A1 | 4/2004 | Lindblad et al. |
| 2004/0091110 A1 | 5/2004 | Barkans |
| 2004/0183775 A1 | 9/2004 | Bell |
| 2005/0028188 A1 | 2/2005 | Latona et al. |
| 2005/0039206 A1 | 2/2005 | Opdycke |
| 2005/0086695 A1 | 4/2005 | Keele et al. |
| 2005/0088407 A1 | 4/2005 | Bell |
| 2005/0089194 A1 | 4/2005 | Bell |
| 2005/0104506 A1 | 5/2005 | Youh et al. |
| 2005/0110964 A1 | 5/2005 | Bell |
| 2005/0122308 A1 | 6/2005 | Bell et al. |
| 2005/0132266 A1 | 6/2005 | Ambrosino et al. |
| 2005/0147282 A1 | 7/2005 | Fujii |
| 2005/0162381 A1 | 7/2005 | Bell et al. |
| 2005/0185828 A1 | 8/2005 | Semba et al. |
| 2005/0195598 A1 | 9/2005 | Dancs et al. |
| 2005/0265587 A1 | 12/2005 | Schneider |
| 2006/0010400 A1 | 1/2006 | Dehlin et al. |
| 2006/0031786 A1 | 2/2006 | Hillis et al. |
| 2006/0132432 A1 | 6/2006 | Bell |
| 2006/0168515 A1 | 7/2006 | Dorsett, Jr. et al. |
| 2006/0184993 A1 | 8/2006 | Goldthwaite et al. |
| 2006/0187545 A1 | 8/2006 | Doi |
| 2006/0227099 A1 | 10/2006 | Han et al. |
| 2006/0242145 A1 | 10/2006 | Krishnamurthy et al. |
| 2006/0256382 A1 | 11/2006 | Matraszek et al. |
| 2006/0258397 A1 | 11/2006 | Kaplan et al. |
| 2006/0294247 A1 | 12/2006 | Hinckley et al. |
| 2007/0002039 A1 | 1/2007 | Pendleton et al. |
| 2007/0019066 A1 | 1/2007 | Cutler |
| 2007/0285419 A1 | 12/2007 | Givon |
| 2008/0013826 A1 | 1/2008 | Hillis et al. |
| 2008/0018595 A1 | 1/2008 | Hildreth et al. |
| 2008/0030460 A1 | 2/2008 | Hildreth et al. |
| 2008/0040692 A1 | 2/2008 | Sunday et al. |
| 2008/0062123 A1 | 3/2008 | Bell |
| 2008/0062257 A1 | 3/2008 | Corson |
| 2008/0090484 A1 | 4/2008 | Lee et al. |
| 2008/0150890 A1 | 6/2008 | Bell et al. |
| 2008/0150913 A1 | 6/2008 | Bell et al. |
| 2008/0252596 A1 | 10/2008 | Bell et al. |
| 2009/0027337 A1 | 1/2009 | Hildreth |
| 2009/0077504 A1 | 3/2009 | Bell et al. |
| 2009/0079813 A1 | 3/2009 | Hildreth |
| 2009/0102788 A1 | 4/2009 | Nishida et al. |
| 2009/0172606 A1 | 7/2009 | Dunn et al. |
| 2009/0179733 A1 | 7/2009 | Hattori et al. |
| 2009/0225196 A1 | 9/2009 | Bell et al. |
| 2009/0235295 A1 | 9/2009 | Bell et al. |
| 2009/0251685 A1 | 10/2009 | Bell et al. |
| 2010/0026624 A1 | 2/2010 | Bell et al. |
| 2010/0039500 A1 | 2/2010 | Bell et al. |
| 2010/0060722 A1 | 3/2010 | Bell et al. |
| 2010/0121866 A1 | 5/2010 | Bell et al. |
| 2011/0157316 A1 | 6/2011 | Okamoto et al. |
| 2012/0200843 A1 | 8/2012 | Bell et al. |

FOREIGN PATENT DOCUMENTS

| | | |
|---|---|---|
| EP | 0 913 790 A1 | 5/1999 |
| EP | 1 689 172 A1 | 6/2002 |
| JP | 57-094672 A | 6/1982 |
| JP | 10-207619 | 8/1998 |
| JP | 11-057216 | 3/1999 |
| JP | 2000-105583 | 4/2000 |
| JP | 2002-014997 | 1/2002 |
| JP | 2002-092023 | 3/2002 |
| JP | 2002-170507 | 6/2002 |
| JP | 2003-517642 | 5/2003 |
| JP | 2003-271084 | 9/2003 |
| KR | 2003-0058894 | 7/2003 |
| WO | WO 98/38533 A1 | 9/1998 |
| WO | WO 00/16562 A1 | 3/2000 |
| WO | WO 01/63916 | 8/2001 |
| WO | WO 02/01537 | 1/2002 |
| WO | WO 02/100094 A2 | 12/2002 |
| WO | WO 2004/055776 A1 | 7/2004 |
| WO | WO 2004/097741 A1 | 11/2004 |
| WO | WO 2005/041578 A2 | 5/2005 |
| WO | WO 2005/041579 A2 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Letter of the opponent O2 dated May 28, 2010 in European Application No. 02739710.8, filed Jun. 4, 2002.

Office Action dated Nov. 16, 2010 from Japanese Patent Application No. 2006-536930.

EffecTV Version 0.2.0 released Mar. 27, 2001, available online at <http://web.archive.org/web/20010101-20010625re__http://effectv.sourceforge.net>.

Index of EffecTV, as downloaded on Apr. 30, 2007 at <http://effectv.cvs.sourceforge.net/effectv/EffecTV/?pathrev=rel__0__2__0>.

R111, The Transformation From Digital Information to Analog Matter, available online at <http://www.particles.de/paradocs/r111/10mikp2004/hmtl/r111__text111hock04.html>, cited on Jan. 17, 2005 during opposition of European Application No. 02739710.8, filed Jun. 4, 2002.

2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of European Application No. 02739710.8, filed Jun. 4, 2002.

Affidavit of Daniel Barthels regarding EffecTV, dated May 15, 2007 (partial machine translation), cited during opposition of European Application No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of European Application No. 02739710.8, filed Jun. 4, 2002.

Bodymover Body Movement as a Means to Obtain an Audiovisual Spatial Experience, 2000 ART+COM AG Berlin; <http://www.artcom.de/index.php?option=com__acprojects&page=6&id=28&Itemid=144&details=0&lang=en>, as downloaded on Aug. 8, 2005.

ART+COM Bodymover 2000, as downloaded on Aug. 21, 2009 from <http://www.artcom.de/index.php?option=com_acprojects&page=6&id=28&Itemid=144&details=0&lang=en>, cited during opposition of European Application No. 02739710.8, filed Jun. 4, 2002.

Article 96(2) Communication dated Feb. 25, 2005 in European Application No. 02739710.8.

Article 96(2) Communication dated Mar. 31, 2004 in European Application No. 02739710.8.

Brown, Matthew, et al. "Multi-Image Matching using Multi-Scale Oriented Patches," Technical Report, Dec. 2004, pp. 1-48, available online at <ftp://ftp.research.microsoft.com/pub/tr/TR-2004-133.pdf>.

Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.

Buxton, Bill, "Multi-Touch Systems That I Have Known and Loved," accessed Mar. 21, 2007, <http://billbuxton.com/multitouchOverview.html>.

Communication dated Dec. 10, 2008 from Patentanwalt attaching article by Katy Bachman, entitled "Reactrix Up for Sale," cited during opposition of European Application No. 02739710.8, filed Jun. 4, 2002.

Crouser, P.D., et al., "Unattenuated tracer particle extraction through time-averaged, background image subtraction with outlier rejection," Experiments in Fluids, 22, 1997, 220-228, Springer-Verlag.

Davis, J.W., et al., "SIDEshow: A Silhouette-based Interactive Dual-screen Environment," Aug. 1998, MIT Media Lab Tech Report No. 457.

Demarest, Ken, "Sand," 2000, Mine Control, art installation, available online at <http://www.mine-control.com>, downloaded on Mar. 15, 2007.

EffecTV Software Source: effect module, dated May 20, 2001 (German); cited during opposition of European Application No. 02739710.8, filed Jun. 4, 2002.

Elgammal, Ahmed, et al., "Non-parametric Model for Background Subtraction," Jun. 2000, European Conference on Computer Vision, Lecture Notes on Computer Science, vol. 1843, pp. 751-767.

Extended Search Report for European Application No. 06010825.5, filed Jun. 4, 2002, dated Jul. 10, 2006.

Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM, Feb. 24-28, 2002, pp. 155-163.

Foerterer, Holger, "Fluidum," 1999, art installation, description available online at <http://www.foerterer.com/fluidum>, downloaded on Mar. 16, 2007.

Foerterer, Holger, "Helikopter," 2001, art installation, description available online at <http://www.foerterer.com/helikopter/index.htm>, downloaded on Mar. 16, 2007.

Freeman, William, et al., "Computer vision for interactive computer graphics," May-Jun. 1998, IEEE Computer Graphics and Applications, vol. 18, No. 3, pp. 42-53.

Frisken, Sarah F. et al., "Adaptively Sampled Distance Fields: A General Representation of Shape for Computer Graphics," Jul. 23-28, 2000, Proceedings of the 27th Annual Conference on Computer Graphics and Interactive Techniques, pp. 249-254.

Fujihata, Masaki, "Beyond Pages," 1995, art installation, description available online at <http://on1.zkm.de/zkm/werke/BeyondPages>, downloaded on Mar. 16, 200.

Goetz, Frank, et al., "An XML-based Visual Shading Language for Vertex and Fragment Shaders," 3D Technologies for the World Wide Web, Proceedings of Ninth International Conference on 3D Technology; ACM, Apr. 5-8, 2004; pp. 87-97.

GroundFX Document, GestureTek (Very Vivid, Inc.), description available online at <http://www.gesturetek.com/groundfx>, downloaded on Aug. 11, 2006.

Haller, Michael et al., "Coeno-Storyboard: An Augmented Surface for Storyboard Presentations," Mensch & Computer 2005, Sep. 4-7, 2005, Linz, Austria.

Han, Jefferson Y., "Low-Cost Multi-Touch Sensing Through Frustrated Total Internal Reflection," Oct. 23-26, 2005, ACM Symposium on User Interface Software and Technology (UIST).

Harville, Michael et al., "Foreground Segmentation Using Adaptive Mixture Models in Color and Depth," Jul. 8, 2001, Proceedings of IEEE Workshop on Detection and Recognition of Events in Video, pp. 3-11.

Hemmer, Raphael Lozano, "Body Movies," 2002, art project/installation, description available online at <http://www.lozano-hemmer.com/eproyecto.html>, downloaded on Mar. 16, 2007.

Hoff, Kenneth E. III et al, "Fast and Simple 2D Geometric Proximity Queries Using Graphics Hardware," Mar. 19-21, 2001, Proc. Of the 2001 Symposium on Interactive 3D Graphics, pp. 145-148.

International Preliminary Examination Report for PCT/US2002/017843, filed Jun. 4, 2002.

International Preliminary Report on Patentability for PCT/US2004/035477, filed Oct. 25, 2004.

International Preliminary Report on Patentability for PCT/US2004/035478, filed Oct. 25, 2004.

International Preliminary Report on Patentability for PCT/US2004/041318, filed Dec. 9, 2004.

International Preliminary Report on Patentability for PCT/US2004/041319, filed Dec. 9, 2004.

International Preliminary Report on Patentability for PCT/US2004/041320, filed Dec. 9, 2004.

International Preliminary Report on Patentability for PCT/US2005/008984, filed Mar. 18, 2005.

International Preliminary Report on Patentability for PCT/US2006/030720, filed on Aug. 4, 2006.

International Preliminary Report on Patentability for PCT/US2008/059900, filed on Apr. 10, 2008.

International Search Report for PCT/US03/40321, filed Dec. 15, 2003.

International Search Report for PCT/US2002/017843, filed Jun. 4, 2002, dated Feb. 5, 2003.

International Search Report for PCT/US2004/035477, filed Oct. 25, 2004.

Invitation to Pay Additional Fees and Partial international Search Report on Patentability for PCT/US2004/035478, filed Oct. 25, 2004.

International Search Report for PCT/US2004/035478, filed Oct. 25, 2004.

International Search Report for PCT/US2004/041318, filed Dec. 9, 2004.

International Search Report for PCT/US2004/041319, filed Dec. 9, 2004.

International Search Report for PCT/US2004/041320, filed Dec. 9, 2004.

International Search Report for PCT/US2005/008984, filed Mar. 18, 2005.

International Search Report for PCT/US2006/030720, filed Aug. 4, 2006.

International Search Report for PCT/US2008/059900, filed Apr. 10, 2008.

International Search Report for PCT/US2008/10750, filed Sep. 15, 2008.

Ivars Peterson, "Artificial reality; combining a person's live video image with computer graphics suggests novel ways of working and playing with computers" Science News, Jun. 22, 1985.

Jabri, Sumer et al., "Detection and Location of People in Video Images Using Adaptive Fusion of Color and Edge Information;" presented at the Int. Conf. Pattern Recognition, Barcelona, Spain, 2000.

Joyce, Arthur W. III, et al., "Implementation and capabilities of a virtual interaction system," Sep. 10-11, 1998, Proceedings 2nd European Conference on Disability, Virtual Reality and Associated Technologies, Skovde, Sweden, pp. 237-245.

Katz, Itai et al., "A Multi-Touch Surface Using Multiple Cameras," Oct. 3, 2007, Advanced Concepts for Intelligent Vision Systems, vol. 4678/2007.

Keays, Bill, "metaField Maze," 1998, exhibited at Siggraph'99 Emerging Technologies and Ars Electronica Aug. 8-13, 1999, description available online at <http://www.billkeays.com/metaFieldInfosheet1A.pdf>.

Keays, Bill, "Using High-Bandwidth Input/Output in Interactive Art," Jun. 1999, Master's Thesis, Massachusetts Institute of Technology, School of Architecture and Planning.

Khan, Jeff; "Intelligent Room with a View"; Apr.-May 2004, RealTime Arts Magazine, Issue 60, available online at <www.realtimearts.net/article/60/7432>.

Kjeldesn, Rick et al., "Dynamically Reconfigurable Vision-Based User Interfaces," Apr. 2003, 3rd International Conference on Vision Systems (ICVVS '03), Graz, Austria, pp. 6-12.

Kjeldsen, R. et al., "Interacting with Steerable Projected Displays," May 20-21, 2002, Proceedings of the 5th International Conference on Automatic Face and Gesture Recognition, Washington, D.C.

Kreuger, Myron, "Videoplace—An Artificial Reality," Apr. 1985, Conference on Human Factors in Computing Systems, San Francisco, California, pp. 35-40.

Kreuger, Myron, "Videoplace," 1969 and subsequent, summary available online at <http://www.jtnimoy.com/itp/newmediahistory/videoplace>, downloaded Mar. 21, 2007.

Lamarre, Mathieu, et al., "Background subtraction using competing models in the block-DCT domain," Pattern Recognition, 2002 Proceedings, 16 International Conference in Quebec City, Que., Canada, Aug. 11-15, 2002.

Lantagne, Michel, et al., "VIP: Vision tool for comparing Images of People," Vision Interface, Jun. 11-13, 2003, pp. 1-8.

Leibe, Bastian, et al., "Towards Spontaneous Interaction with the Perceptive Workbench, a Semi-Immersive Virtual Environment," Nov./Dec. 2000, IEEE Computer Graphics and Applications, vol. 20, No. 6, pp. 54-65.

Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.

Levin, Golan "Computer Vision for Artists and Designers: Pedagogic Tools and Techniques for Novice Programmers," Aug. 2006, AI & Society, vol. 20, Issue 4, pp. 462-482.

Letter dated May 16, 2007 from Christian Zuckschwerdt regarding EffecTV, (partial machine translation), cited during opposition of European Application No. 02739710.8, filed Jun. 4, 2002.

Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.

Livingston, Mark Alan, "Vision-based Tracking with Dynamic Structured Light for Video See-through Augmented Reality," 1998, Ph.D. Dissertation, University of North Carolina at Chapel Hill, cited on Jun. 18, 2007 during opposition of European Application No. 02739710.8, filed Jun. 4, 2002.

Malik, Shahzad et al., "Visual Touchpad: A Two-Handed Gestural Input Device," Oct. 13-15, 2004, International Conference on Multimodal Interfaces (ICMI '04).

MacIver, Malcolm, et al., "Body Electric," Apr. 15-Jun. 29, 2003, art installation, description available online at <http://www.neuromech.northwestern.edu/uropatagium/#ArtSci>.

Mandala Systems, "Video Gesture Control System Concept," 1986, description available online at <http://www.vividgroup.com/tech.html>, downloaded on Mar. 16, 2007.

Microsoft Surface multi-touch interface table unveiled, May 30, 2007, downloaded from <http://www.dancewithshadows.com/tech/microsoft-surface.asp>.

Microsoft Surface Web Page, downloaded from <http://www.microsoft.com/surface/Pages/Product/WhatIs.aspx> on Sep. 24, 2009.

Experience Microsoft Surface, downloaded from <http://www.microsoft.com/surface/Pages/Product/Specifications.aspx> on Sep. 24, 2009.

Microsoft Surface, downloaded from <http://en.wikipedia.org/wiki/Microsoft_surface> on Sep. 24, 2009.

Mitsubishi DiamondTouch, <http://www.merl.com/projects/DiamondTouch/> visited Mar. 21, 2007.

Mo, Zhenyao "SmartCanvas: A Gesture-Driven Intelligent Drawing Desk System," Jan. 9-12, 2005, Proceedings of Intelligent User Interfaces (IUI '05).

Morano, Raymond A. et al., "Structured Light Using Pseudorandom Codes," Mar. 1998, IEEE Transactions on Pattern Analysis and Machine Intelligence, vol. 20, No. 3.

Morris, T. et al., "Real-Time Fingertip Detection for Hand Gesture Recognition," Sep. 9-11, 2002, Advanced Concepts for Intelligent Vision Systems (ACIVS '04), Ghent University, Belgium.

Muench, Wolfgang, "Bubbles", Prix Ars Electonica Catalog 1999, Springer-Verlag, Berlin, Germany; available online at <http://hosting.zkm.de/wmuench/bub/text>, downloaded on Mar. 16, 2007.

Notice of Opposition in European Application No. 02739710.8 dated May 14, 2007.

Provision of the minutes in European Application No. 02739710.8 dated Dec. 28, 2009.

Decision revoking the European Patent in European Application No. 02739710.8 dated Dec. 28, 2009.

Observation by third party Michael Saup dated Jan. 17, 2005, cited during opposition of European Application No. 02739710.8, filed Jun. 4, 2002.

Observation by third party Petra Trefzger dated Jan. 17, 2005, cited during opposition of European Application No. 02739710.8, filed Jun. 4, 2002.

Observation by third party Simon Penny dated Jan. 17, 2005, cited during opposition of European Application No. 02739710.8, filed Jun. 4, 2002.

Paradiso, Joseph et al., "New Sensor and Music Systems for Large Interactive Surfaces," Aug. 2000, Proceedings of the Interactive Computer Music Conference, Berlin, Germany, pp. 277-280.

Penny, Simon, "Fugitive"; Oct. 1997; <http://www.ace.uci.edu/penny/works/fugitive/fugitive.html>.

Penny, Simon, et al., "Fugitive II," Jan. 8-Mar. 14, 2004, Australian Center for the Moving Image, art installation, description available online at <http://www.acmi.net.au/fugitive.jsp?>.

Penny, Simon, et al.; TRACES: WIRELESS full body tracking in the CAVE, Dec. 16-18, 1999; Japan; ICAT Virtual Reality Conference; <http://turing.ace.uci.edu/pennytexts/traces/>.

Pinhanez, C. et al., "Ubiquitous Interactive Graphics," Jul. 29-31 2003, IBM Research Report RC22495, available at <http://www.research.ibm.com/ed/publications/rc22495.pdf>.

Pinhanez, C., "The Everywhere Displays Projector: A Device to Create Ubiquitous Graphical Interfaces," Ubicomp 2001: Ubiquitous Computing: International Conference Atlanta, Georgia, USA, Sep. 30-Oct. 2, 2001 Proceedings (Lecture Notes in Computer Science), pp. 315-331.

PLASMA; 3 pages; <http://www.particles.de/paradocs/plasma/index.html>, cited in U.S. Appl. No. 10/160,217 on Aug. 8, 2005.

Reactrix, Inc. website, Mar. 28, 2003, <http://web.archive.org/web/20030328234205/http://www.reactrix.com> and <http://web.archive.org/web/20030328234205/http://www.reactrix.com/webdemo.php>.

Rekimoto, J., et al., "Perceptual Surfaces: Towards a Human and Object Sensitive Interactive Display," Oct. 19-21, 1997, Proceedings of the Workshop on Perceptual User Interfaces, Banff, Canada, pp. 30-32.

Ringel, M. et al., "Barehands: Implement-Free Interaction with a Wall-Mounted Display," Mar. 31-Apr. 5, 2001, Proceedings of the 2001 ACM CHI Conference on Human Factors in Computing Systems (Extended Abstracts), p. 367-368.

Rogala, Miroslaw, "Lovers Leap," Nov. 21-26, 1995, art installation, Dutch Electronic Arts Festival, description available online at <http://wayback.v2.nl/DEAF/persona/rogala.html>.

Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.

Rokeby, David, "softVNS 2 real time video processing and tracking software for Max;" SoftVNS 2 downloads, as downloaded from <http://homepage.mac.com/davidrokeby/softVNS.html> on Mar. 16, 2007.

Sato, Yoichi, et al., "Fast Tracking of Hands and Fingertips in Infrared Images for Augmented Desk Interface," Mar. 2000, 4th International Conference on Automatic Face-and Gesture-Recognition, Grenoble, France.

Schneider, John K., "Improved Fingerprint System Using Rolled and Multi-segmented Techniques," Provisional U.S. Appl. No. 60/575952, filed Jun. 1, 2004, pp. 1-6.

Screenshots of Reactrix Product Demo Video, Mar. 28, 2003, <http://web.archive.org/web/20030407174258/http://www.reactrix.com/demo/reactrix_demo.wmv>.

Sester, Marie, "Access," Dec. 2001, Interaction 99 Biennial Catalog, Gifu, Japan, available online at <http://www.accessproject.net/concept.html>.

Snibbe, Scott, "Boundary Functions," Sep. 7-12, 1998, art installation, description available online at <http://snibbe.com/scott/bf/index.html>.

Snibbe, Scott, "Screen Series," 2002-2003 art installation, description available online at <http://snibbe.com/scott/screen/index.html>, downloaded on Mar. 16, 2007.

Sonneck, Georg, et al., "Optimized One-to-One Personalization of Web Applications using a Graph Based Model," IEEE-22, Apr. 26, 2003, 9 pgs.

Sparacino, Flavia, et al., "Media in performance: interactive spaces for dance, theater, circus and museum exhibits," Nov. 2000, IBM Systems Journal, vol. 39, No. 3-4, pp. 479-510.

Sparacino, Flavia, "(Some) computer visions based interfaces for interactive art and entertainment installations," 2001, INTER_FACE Body Boundaries, Anomalie digital_arts, No. 2, Paris, France, <http://alumni.media.mit.edu/~flavia/publications.html>, cited on Jul. 15, 2005 during opposition of Canadian Application No. 2449300, filed Jun. 4, 2002.

Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.

Summons to Attend Oral Proceedings in European Application No. 02739710.8, dated Aug. 12, 2005.

Summons to Attend Oral Proceedings in European Application No. 02739710.8, dated Jun. 12, 2009.

Supreme Particles, "Plasma/Architexture," 1994, available online at <http://www.particles.de/paradocs/plasma/plasma_e.html>, downloaded on May 21, 2007.

Supreme Particles; R111, 1999, available online at <http://www.r111.org>, obtained Jul. 12, 2005, XP-002989704.

Tan, P, et al., "Highlight Removal by Illumination-Constrained Inpainting," Ninth IEEE International Conference on Computer Vision, Oct. 13-16, 2003.

The History of Microsoft Surface, downloaded from <http://www.microsoft.com/presspass/presskits/surfacecomputing/docs/SurfaceHistoryBG.doc> on Sep. 24, 2009.

Torr, P.H.S. et al., "The Development and Comparison of Robust Methods for Estimating the Fundamental Matrix," Sep./Oct. 1997, International Journal of Computer Vision, vol. 24, No. 3, pp. 271-300.

Toth, Daniel et al., "Illumination-Invariant Change Detection," Apr. 2-4, 2000, 4th IEEE Southwest Symposium on Image Analysis and Interpretation, p. 3.

Trefzger, Petra, "Vorwerk," 2000, art installation, description available online at <http://www.petracolor.de/> cited on Jan. 17, 2005 during opposition of European Application No. 02739710.8, filed Jun. 4, 2002.

Utterback, Camille, et al., "Text Rain,"1999, art installation, available online at <www.camilleutterback.com/textrain.html>, Mar. 16, 2007.

Vogt, Florian et al., "Highlight Substitution in Light Fields," IEEE International Conference on Image Processing, Sep. 22-25, 2002.

Wang, Junxian, et al., "Specular reflection removal for human detection under aquatic environment," Jun. 27-Jul. 2, 2004 IEEE Conference on Computer and Pattern Recognition Workshop (CVPRW04) vol. 8, p. 130.

Wellner, Pierre, "Interacting with paper on the DigitalDesk," Jul. 1993, Communications of the ACM, Special issue on computer augmented environments: back to the real world, vol. 36, Issue 7, pp. 87-96.

Wellner, Pierre, "Digital Desk Calculator: Tangible Manipulation on a Desktop Display" Proceedings of the Symposium on User Interface Software and Technol (UIST), Hilton Head, S. Carolina, Nov. 11-13, 1991.

Wilson, Andrew, "PlayAnywhere: A Compact Interactive Tabletop Projection-Vision System," ACM Symposium on User Interface Software and Technology (UIST), Oct. 23-27, 2005, Seattle, Washington, U.S.A.

Written Opinion of the International Searching Authority for PCT/US2002/017843, filed Jun. 4, 2002.

Written Opinion of the International Searching Authority of the International Searching Authority for PCT/US2004/035477, filed Oct. 25, 2004.

Written Opinion of the International Searching Authority for PCT/US2004/035478, filed Oct. 25, 2004.

Written Opinion of the International Searching Authority for PCT/US2004/041318, filed Dec. 9, 2004.

Written Opinion of the International Searching Authority for PCT/US2004/041319, filed Dec. 9, 2004.

Written Opinion of the International Searching Authority for PCT/US2004/041320, filed Dec. 9, 2004.

Written Opinion of the International Searching Authority for PCT/US2005/008984, filed Mar. 18, 2005.

Written Opinion of the International Searching Authority for PCT/US2006/030720, filed Aug. 4, 2006.

Written Opinion of the International Searching Authority for PCT/US2008/059900, filed Apr. 10, 2008.

Kaushal Kurapati et al., "A Multi-agent TV Recommender" Workshop on Personalization in Future TV, Jul. 13, 2001, pp. 1-8, XP02228335.

DePiero et al; "3-D Computer Vision Using Structured Light: Design, Calibrations and Implementation Issues"; Advances in Computers, vol. 43, pp. 243-278, 1996.

Huang, Mark et al. "Shadow Vision," Introduction to Computer Graphics, Fall 1999, Dec. 6, 1999; pp. 1-10, XP55013291 http://groups.csail.mit.edu/graphics/ciasses/6,837/F99/projects/reports/team16.pdf.

Langer, Maria, "Mac OS X 10.2: Visual QuickStart Guide," Sep. 17, 2002, Peachpit Press, p. 111.

Leibe, Bastian, et al., "The Perspective Workbench; Toward Spontaneous and Natural Interaction in Semi-Immersive Virtual Environments," Mar. 18-22, 2000, IEEE Computer Society, Los Alamitos, CA; pp. 13-20.

Paradiso, Joseph et al., "Optical Tracking for Music and Dance Performance," Conference on Optical 3-D Measurement Techniques, XX, XX, No. 4th, Sep. 30, 1997, pp. 1-8, XP002548974. http://www.media.mit.edu/resenv/pubs/papers/97_09_Zurich_3D4.pdf.

Quinz, Emanuele; "Conference Papers", Apr. 10, 2001, XP55013293, Retrieved from the internet http://www.isea2000.com/pop_actes.htm.

Quinz, Emanuele; "Digital Performance", pp. 1-3, Retrieved from the internet on Nov. 28, 2011 http://www.noemalab.org/sections/ideas/ideas_articles/pdf/.

Rekimoto, Jun, "SmartSkin: An Infrastructure for Freehand Manipulation on Interactive Surfaces." vol. No. 4, Issue No. 1, pp. 113-120, Apr. 2002.

Sparacino, Flavia, et al., "Dance Space: An Interactive Video Interface", Actes/Proceeding, ISEA2000—Oct. 12, 2000—Auditorium 1, Dec. 10, 2000.

Xiao, Yang; "Throughput and Delay Limits of IEEE 802.11," IEEE Communications Letters, vol. 6, No. 8, pp. 355-357, Aug. 2002.

Office Action in U.S. Appl. No. 10/973,335, dated Oct. 2, 2008.

Office Action in U.S. Appl. No. 12/417,588, dated Aug. 6, 2012.

Official Communication in Chinese Patent Application No. 2004-80030951.8, dated Mar. 27, 2009.

Official Communication in Chinese Patent Application No. 2004-80030951.8, dated Sep. 11, 2009.

Official Communication in Chinese Patent Application No. 2004-80030951.8, dated Jan. 8, 2010.

Official Communication in Japanese Patent Application No. 2006-536930, dated Jul. 12, 2010.

Official Communication in Japanese Application No. 2006-536930, dated Dec. 21, 2010.

Official Communication in Japanese Application No. 2006-536930, dated Mar. 23, 2011.

Official Communication in Korean Patent Application No. 2006-7007617, dated Mar. 18, 2011.

* cited by examiner

METHOD AND SYSTEM FOR MANAGING AN INTERACTIVE VIDEO DISPLAY SYSTEM

CROSS-REFERENCE TO RELATED APPLICATIONS

This application is a continuation of U.S. application Ser. No. 10/973,335, filed Oct. 25, 2004. U.S. application Ser. No. 10/973,335 claims the benefit of U.S. Provisional Patent Application No. 60/514,232, filed on Oct. 24, 2003, both of which are herein incorporated by reference.

FIELD OF INVENTION

The present invention relates to the field of visual electronic displays. Specifically, embodiments of the present invention relate to a self-contained interactive video display system.

BACKGROUND OF THE INVENTION

Advertising is used to convey various types of information to an audience. To fully maximize the performance of an advertisement, it is desirable for the advertiser to be able to gather information regarding effectiveness of the advertisement(s). This effectiveness measure may comprise both how many people saw the advertisement, whether people paid attention to it. In general, for traditional offline advertising (e.g., billboards, posters, television commercials) data gathering is typically based on information related to where the advertisement is placed. For example, for a billboard advertisement, effectiveness may be measured by the amount of automobile traffic that passes the billboard. Similarly, for a television commercial, effectiveness, or popularity, may be based on popularity ratings for the television show during which the television commercial was aired. In this way, information regarding the popularity of an advertisement may be inferred based on the advertisement placement information. However, it is typically very difficult to directly measure popularity of traditional advertisements. Because these advertisements are not interactive, it is difficult to know if people are actually paying attention to them.

Recent technological advancements have led to the creation of a new type of advertising medium, the interactive video display system. Interactive video display systems allow real-time unencumbered human interactions with video displays. Natural physical motions by human users are captured by a computer vision system and used to drive visual effects. The computer vision system usually uses images captured by a video camera as input and has software processes that gather real-time information about people and other objects in the interactive area viewed by the camera.

For interactive video display systems, it is possible to gather information regarding displayed images based on the same methods used for traditional offline advertising mediums. However, in addition to providing real-time interactions, it would be desirable to have an interactive video display system that is capable of capturing and managing information derived from such real-time interactions not available to traditional offline advertising mediums.

SUMMARY OF THE INVENTION

Various embodiments of the present invention, a method and system for managing a video interactive video display system, are described herein. In one embodiment, a plurality of video spots are displayed on the interactive video display system.

Data based on interactions with the interactive video display system corresponding to video spots of the plurality of video spots is gathered. In one embodiment, the interaction is determined according to person tracking. In another embodiment, the interaction is determined according to a foreground/background classification image. In one embodiment, the data includes information about what virtual objects displayed by the interactive video display system were interacted with. In one embodiment, the data includes information about a location of the interaction relative to a display of the interactive video display system.

The data may then be stored and may be used in managing presentation of the video spots. In one embodiment, the data is stored at a local memory of the interactive video display system. In another embodiment, the data is transmitted to an external computer system and is stored in a memory of the external computer system.

In one embodiment, the data is analyzed for use in managing presentation of the plurality of video spots. In one embodiment, analyzing the data includes determining popularity for at least one video spot of the plurality of video spots based on the data. In another embodiment, analyzing the data includes determining a "first user attraction level" for at least one video spot of the plurality of video spots based on the data. In another embodiment, analyzing the data includes determining a group appeal for at least one video spot of the plurality of video spots based on the data. In one embodiment, external data is gathered for use in analyzing the data.

In one embodiment, the display schedule of the plurality of video spots is adjusted based on analyzing data. In one embodiment, the display schedule is automatically adjusted based on the analysis. In another embodiment, the display schedule is manually adjusted based on the analysis.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, an electronic device for monitoring the presence of objects around a second electronic device, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "presenting" or "gathering" or "storing" or "transmitting" or "analyzing" or "determining" or "adjusting" or "managing" the like, refer to the action and processes of an electronic system (e.g., 200 of FIG. 2), or similar electronic computing device, that manipulates and transforms data represented as physical (electronic) quantities within the electronic device's registers and memories into other data similarly represented as physical quantities within the electronic device memories or registers or other such information storage, transmission or display devices.

Various embodiments of the present invention in the form of one or more exemplary embodiments will now be described. In one embodiment, the interactive video display system includes a vision system that captures and processes information relating to a scene. The processed information is used to generate certain visual effects that are then displayed to viewers via an interactive display device. People are able to interact with such visual effects on a real-time basis.

Figure 1A:
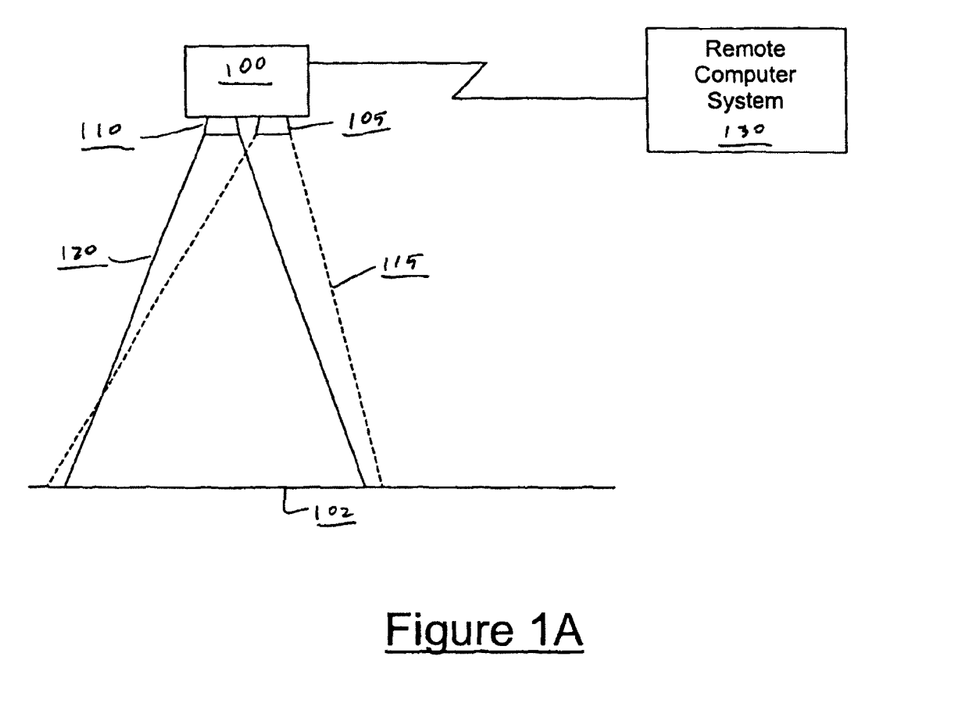
FIG. 1A illustrates a projection interactive video display system in accordance with an embodiment of the present invention.

FIG. 1A illustrates a projection interactive video display system 100 in accordance with an embodiment of the present invention. Projective interaction display system 100 uses a camera system 105, an illuminator that illuminates surface 102 being viewed by camera 105, a projector 110 that projects an image 120 onto the interactive space 115 of surface 102, and a local computer (not shown) that takes as input the image of camera 105 and outputs a video image to projector 110.

The local computer processes the camera 105 input to discern information about the position and movement of people (or moving objects) in the volume in front of surface 102. In one embodiment, the local computer processes the camera 105 input to discern on a pixel-by-pixel basis what portions of the volume in front of surface 102 (e.g., interactive space 115) are occupied by people (or moving objects) and what portions of surface 102 are background. The local computer may accomplish this by developing several evolving models of what the background is believed to look like, and then comparing its concepts of the background to what camera 105 is currently imaging. Components of the local computer that process camera 105 input are collectively known as the vision system. Various embodiments of projection interactive video display system 100 and the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

In one embodiment, projection interactive video display system 100 is coupled to a remote computer system 130. In one embodiment, remote computer system 130 is a remote server for collecting data gathered by projection interactive video display system 100. In one embodiment, remote computer system 130 is configured to collect data gathered by multiple projection interactive video display systems 100 that are located in physically distinct locations. It should be appreciated that remote computer system 130 may be located in a different physical location than projection interactive video display system 100.

Figure 1B:
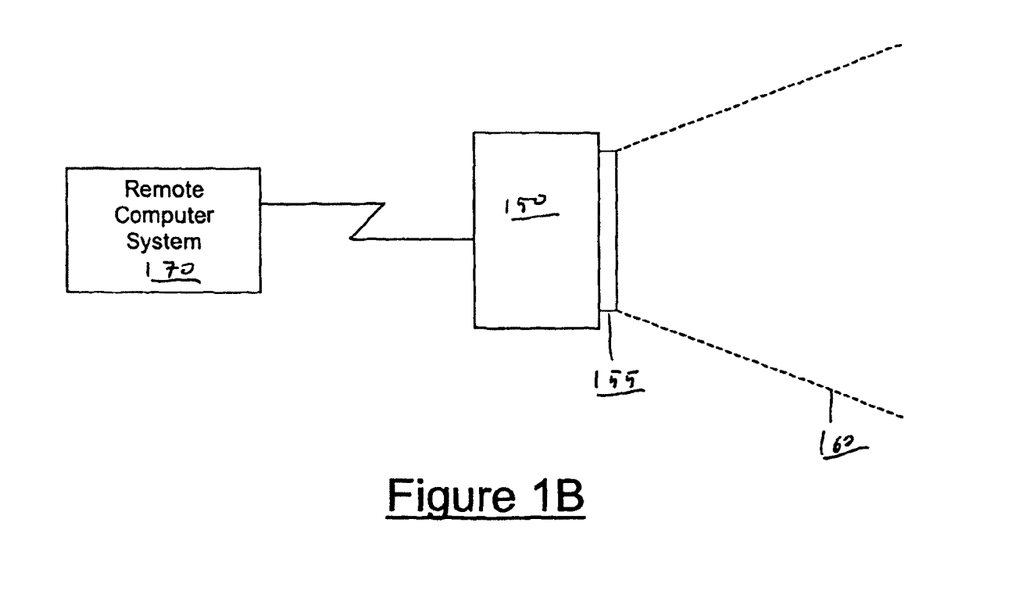
FIG. 1B illustrates a self-contained interactive video display system in accordance with an embodiment of the present invention.

FIG. 1B illustrates a self-contained interactive video display system 150 in accordance with an embodiment of the present invention. Self-contained interactive video display system 150 displays an image onto display screen 155, and uses a camera (not shown) to detect people and objects in interactive space 160. A local computer (not shown), also referred to as the image system, takes as input the image of the camera and outputs a video image to display screen 155.

Various embodiments of self-contained interactive video display system 150 are described in co-pending U.S. patent application Ser. No. 10/946,263, filed on Sep. 20, 2004, entitled "SELF-CONTAINED INTERACTIVE VIDEO DISPLAY SYSTEM," by Bell et al., and assigned to the assignee of the present application, co-pending U.S. patent application Ser. No. 10/946,084, filed on Sep. 20, 2004, entitled "SELF-CONTAINED INTERACTIVE VIDEO DISPLAY SYSTEM," by Bell, and assigned to the assignee of the present application, and co-pending U.S. patent application Ser. No. 10/946,414, filed on Sep. 20, 2004, entitled "INTERACTIVE VIDEO WINDOW DISPLAY SYSTEM," by Bell, and assigned to the assignee of the present application, all of which are herein incorporated by reference. Furthermore, various embodiments of the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

In one embodiment, self-contained interactive video display system 150 is coupled to a remote computer system 170. In one embodiment, remote computer system 170 is a remote server for collecting data gathered by self-contained interactive video display system 150. In one embodiment, remote computer system 170 is configured to collect data gathered by multiple self-contained interactive video display systems 150 and/or projection interactive video display systems 100 (FIG. 1A) that are located in physically distinct locations. It should be appreciated that remote computer system 170 may be located in a different physical location than self-contained interactive video display system 150. Many other forms of interactive video display systems exist. These systems may use different kinds of display media, and different sensing apparatus. However, the techniques described in this patent are fully applicable to these other systems as well.

Figure 2:
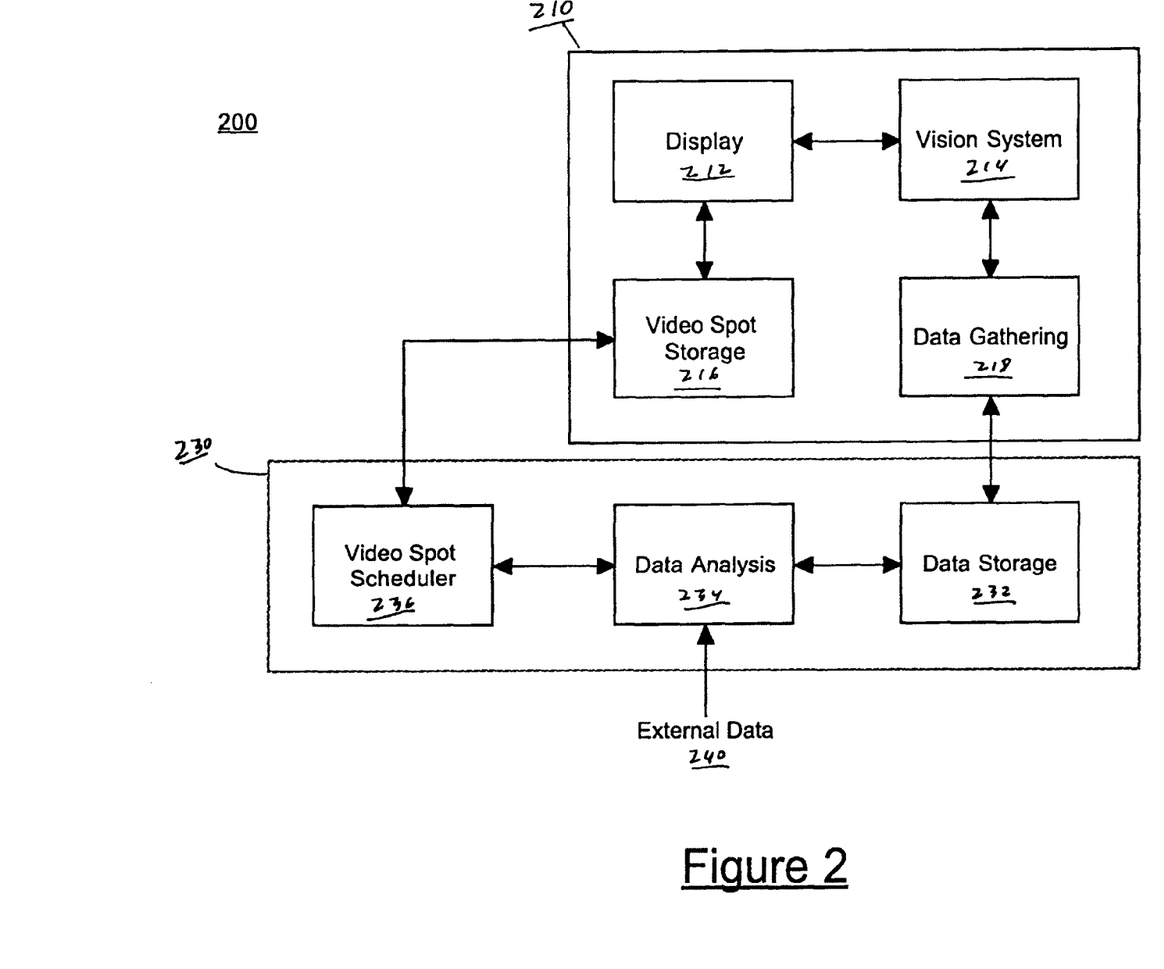
FIG. 2 illustrates a system for managing an interactive video display system in accordance with an embodiment of the present invention.

FIG. 2 illustrates a system 200 for managing an interactive video display system in accordance with an embodiment of the present invention. System 200 includes interactive video display system 210 (e.g., projection interactive video display system 100 of FIG. 1A or self-contained interactive video display system 150 of FIG. 1B) and remote computer system 230 (e.g., remote computer system 130 of FIG. 1A or remote computer system 170 of FIG. 1B). Interactive video display system 210 includes display 212, vision system 214, video spot storage 216, and data gathering module 218. In one embodiment, display 212, vision system 214, video spot storage 216, and data gathering module 218 are components of a computer system of interactive video display system 210. Remote computer system 230 includes data storage 232, data analysis module 234, and video spot scheduler 236. It should be appreciated that in various embodiments of the present invention, any or all of the components and functionality of remote computer system 230 may be local and included in interactive video display system 210.

Data Gathering

In an exemplary aspect, interactive video display system 210 presents a rich opportunity to gather data about interactions with and usage of the interactive displays. This data is gathered at data gathering module 218, and is useful for many kinds of interactive contents and applications. In one exemplary embodiment, the data is useful for designing advertising contents 20 as it allows advertisers to analyze where and when their advertisements are most popular, thus, allowing them to adjust their advertisements and/or schedules accordingly.

The data may be analyzed locally by the same computer that handles vision system 214. Alternatively, interactive video display system 210 may be networked, allowing the data for one or more systems to be analyzed from remote computer system 230. The data from multiple systems may be pooled to increase the total amount of data or to identify differences between locations.

By using a person-tracking process, real-time information relating to the present and past positions of people viewed by a camera of vision system 214 or a separate camera, can be determined. Using this information, additional information can be derived including, for example, the number of people on or near the display 212, the time at which each person enters and leaves the display 212 (e.g., interactive area 115 of FIG. 1A), and whether they are moving and interacting with the displayed image. In one embodiment of interactive video display system 210, such as, a floor or wall-projected interactive display, the boundaries of the display screen are known. Thus, based on the respective positions of the people, additional information about the people within display 212 can be derived. For example, specific information can be determined based on the number of people who are interacting with Interactive video display system 210 and the number of people who are mere spectators. In addition, with face-recognition systems, it is also possible to gather demographic data such as gender. It should be appreciated that the person tracking system may take the form of a face-tracking system, in which heads are counted and tracked instead of entire bodies. A variety of person-tracking processes exist. These processes may use one or more of a variety of systems and techniques including, but not limited to, stereo cameras, time-of-flight cameras, depth segmentation, color segmentation, feature tracking, face detection, template matching, adaptive template matching, and blob tracking.

Similar data can be gathered from a foreground/background classification image, which may be produced by vision system 214. The portion of the image that is classified as foreground is a rough approximation of the number of people viewed by the camera. If the width and height of the screen viewed by the camera and the approximate crosssectional size of a typical person from the camera's point of view are known, then the approximate portion of the screen that is turned to foreground by the presence of a single person can be computed. Consequently, a conversion can be made from foreground portion to number of people. Alternatively, by doing some experiments with a person in front of the camera, the approximate portion of foreground that corresponds to a single person for a given installation can be determined. This "foreground portion" data can be used to roughly estimate how popular the display is at a given time, and whether people are entering or leaving the display. Because the physical boundaries of interactive video display system 210 may only take up a portion of the camera's view, the foreground/background classification image can be segmented into different regions, such as, "on the display", "within one foot of the display's boundary" "off the display, but within 4 feet of it" and the foreground portions for each region can be recorded separately. Small thumbnail or full-size copies of the vision foreground-background classification image can also be directly logged for later analysis Data from the person-tracking information and/or the foreground portions may be referred to as vision data and can be written (e.g., stored) on a periodic basis (e.g., once per second) to a log file. In one embodiment, the log file is stored in data storage 232. This log file can then be analyzed, either locally or centrally, at a later time by data analysis module 234. In addition, the log entries may be timestamped and may contain information about what content is running at that time.

In addition to the vision data, data about the specific interactions that took place on the display can be gathered. For example, suppose that interactive video display system 210 is showing a survey that asks users questions and takes their responses by having them touch virtual buttons. The votes on the virtual survey could be recorded in the logs along with the vision data. In the case of video game content, the scores and actions of the players could be added to the log file. In the case of interactive informational content, such as, a virtual shopping catalog, each instance of a product or item being viewed could be recorded in the log file. In general, any information about an instance of human interaction with a virtual object on the screen can be logged for later analysis. This can be used as a valuable feedback tool for advertisers, game designers, and content creators.

Use of Data for Monitoring

In many situations, the display or screen of interactive video display system 210 requires maintenance and cleaning. In public installations, this maintenance and cleaning generally takes place after hours, when the display is turned off. In order to verify that maintenance and cleaning is taking place on a regular basis, the data logs can be checked for activity after hours.

Analysis of Content Popularity

In other situations, interactive video display system 210 sequentially displays different pieces of content, which will be referred to as "spots" or "video spots", each for a length of time. The spots are stored in video spot storage 216. This series of spots can be conceptually compared to a series of television commercials. There is flexibility in the number of spots, the length of time that they play, and the order in which they play. In one embodiment, video spot scheduler 236 controls the scheduling of the spots, wherein video spot scheduler 236 may be located locally or remotely, as described above.

Data analysis module 234 is operable to perform data analysis on the gathered data stored in data storage 232. In one embodiment, the popularity of each spot can be determined based on the logged data as described above. For example, a spot's popularity can be measured by taking the average of the logged values for the foreground portion or the number of people on the screen during the periods when the spot was showing. However, there are various issues that should be considered with the foregoing approach. First, the number of people on the screen when the spot begins playing is determined by the popularity of the previous spot. For example, a spot that follows an unpopular spot will tend to have lower activity levels than it otherwise would have. Second, the number of people interacting with a spot depends on the number of people near the display; if very few people are in the venue where the interactive system is installed, then relatively few people will interact with the system. Ways to handle the foregoing problems will be further described below.

Controlling Effects of Prior Spot Popularity

There are several ways to reduce or eliminate the effects of the previous spot's popularity on the spot that is being evaluated. In one embodiment, the order in which spots are played is randomized, so that each spot follows each other spot with equal probability. There may be some deviation from true randomness to prevent the same spot from playing twice in too short a time period. Thus, any effect of the previous spot on the current spot's popularity would be averaged out across all spots, giving a somewhat better sense of the spot's true popularity.

In another embodiment, the length of time that the spot runs can be increased so that the effects of the previous spot are limited.

Furthermore, there are other ways of measuring various aspects of popularity that are less sensitive to the popularity of the previous spot. The following are some illustrative examples. In the case of examples that describe what to do for each showing of the spot, presume that the statistic gathered is averaged over the number of showings. Nearly all these techniques work for both person-tracking data and foreground portion data. Techniques described earlier explain how to turn foreground portion data into a rough estimate of the number of people. These techniques can be applied equally well to data from the camera's whole image or data from a specified region, such as the area within the interactive display or the area near the interactive display.

In one embodiment, for each showing of the spot, only the data for the last few seconds of the showing is analyzed when computing the average number of people or foreground portion. This average is referred to as "average popularity". In another embodiment, for each showing of the spot, the difference between the showing's average popularity and the average popularity during the previous spot is computed. This shows whether the current spot caused an increase in the number of people on the screen.

The above two approaches can be combined; in another embodiment, the difference between the showing average popularity and the average popularity during the previous spot is computed. However, only the last few seconds of the showing's of the current spot and the previous spot are used when computing the averages.

In another embodiment, for each showing of the spot, the difference between the number of people (or foreground portion) at the beginning of the showing and the number of people (or foreground portion) at the end of the showing is computed. The beginning and end could either be instantaneous or refer to the average of the first few seconds and last few seconds respectively.

It should be appreciated that the aforementioned approaches to determining popularity attempt to measure how many people were interacting with the display as a result of a particular spot. However, there are other types of statistics that can be gathered with regard to human inter actions with the interactive display. The next few paragraphs describe other such measures.

In a further embodiment, for each showing of the spot, the number of people who entered the display and the number of people who left the display during the showing are counted. Popular spots, of course, have more people enter and fewer people leave, in some cases, though, it would be desirable to have many people enter and leave, thus allowing the content to be seen by as many people as possible. The information about the number of people entering and leaving can be derived directly from person tracking data or estimated from the foreground portion data by looking for quick rises and drops (of a particular minimum size) in the foreground portion data.

In another embodiment, for each showing of the spot, the average length of time that people playing with the spot have been on the display is recorded. Depending on the kind of message delivered by the interactive content, the person controlling the system may want either a long or a short length of stay.

In another embodiment, the amount of movement that takes place during the spot's showings is recorded. The amount of movement can be derived as the average speed of people on the display, which can be found by examining the position information in the person-tracking data. An alternative measure of the amount of movement can be calculated from the foreground. background images by computing the portion of pixels that switched from foreground to background or vice versa between two such images a very short time apart. In order to compute the average amount of movement, this image difference would ideally be made several times during each showing of the spot. This allows the person controlling the system to distinguish between spots that promote lively behavior and spots that create a more sedate atmosphere but are nonetheless popular.

In another example, for each spot, the number of showings for which no one was interacting with the display the beginning (or no one interacted with the previous spot) but at least one person was interacting at the end is determined. This measures the spot's "first user attraction level," e.g., how good it is attracting a person to interact with the display when there currently is no one interacting with the display. In a similar way, a spot's "group appeal" can be characterized by the number of times that one person was playing with the spot at the beginning of the showing and multiple people were playing with the spot at the end of the showing.

Controlling Overall Traffic Level

Embodiments of the present invention provide a way to account for the number of people in the venue where interactive video display system 210 is installed. One way to do this would be to simply obtain attendance data from the venue; many venues have such data by day and even by hour. Alternatively, the attendance data can be obtained by performing surveys or spot checks on the number of people in attendance, or by use of a wide-angle camera and analysis of the camera image to determine the number of people in attendance. Then, the popularity of each spot relative to the overall number of people who saw the interactive display system can be determined. Then, a given spot's popularity could then be compared fairly across venues with very different levels of attendance.

Alternatively, if it is desired to compare the relative popularity of different spots, all the spots could be run at the same general time of day for the same days and in the same venues so that any differences in overall traffic level affect all spots equally.

External Factors Affecting Popularity

The popularity of a given spot may vary greatly depending on a variety of other conditions or factors. These external factors 240 include, but are not limited to, time of day, day of the week, season, weather, physical location of installation (geography), type of interactive installation (wall projection, floor projection etc.), gender, age, income demographic of people visiting the venue of the installation, and how frequently the spot is shown, etc.

Spots that are popular under one set of conditions may be less popular under another set of conditions. In one embodiment, data analysis module 234 is operable to receive external data 240 in its analysis of the data. Since this data is either recorded in the spot logs or can be matched (based on time and location) to the spot logs, statistics on the popularity of a spot can be determined given some or all of these conditions.

Using Popularity Information

If a goal is to schedule a set of spots for a given interactive video display that optimizes the overall popularity of the display, then past popularity data from one or more interactive video displays can be analyzed to determine what spots should be chosen.

It is useful to put the popularity log information, along with associated external factors in a central searchable database format such as MySQL, especially if there are multiple installations of interactive video displays.

The people responsible for determining the schedule of spots can make use of this database by querying for the popularity data for these spots from the database. They have the option of limiting this data to similar external factors (e.g., looking up the popularity of spots running on weekdays from 10:00 PM to 12:00 AM at mall installations in New England) so as to allow the most accurate judgments to be made. The database could then produce a list of the most popular spots given those conditions. Based on what the scheduler wants, different methods of computing popularity, such as the ones described earlier, may be employed.

Automatic Scheduling

The spot popularity data can also be used to allow for automatic scheduling at video spot scheduler 236, both at a micro and at a macro level. At a micro level, an interactive video display system could run spots that are found through the log processing to have high "first user attraction level" (as defined earlier) when there is no one at the display and run spots with high "group appeal" (as defined earlier) when there is currently one person at the display. In addition, the system could look at its own spot popularity data over the last few minutes or hours, and change the schedule to show popular spots more often or stop showing unpopular spots. The system could even directly solicit feedback from users. For example, the system could display an interactive button that asks users to touch the button if they like the spot and want to see more like it.

At a macro level, a variety of machine learning processes can be employed, including but not limited to, neural networks, hidden Markov models, a mixture of Gaussian models, and principal component analysis, to build a model of the relationships between the popularity of each showing of each spot and the set of conditions under which that showing occurred. These machine learning processes could then automatically predict what set of spots would perform best at any given time and place, and automatically reschedule them to optimize their popularity.

Figure 3:
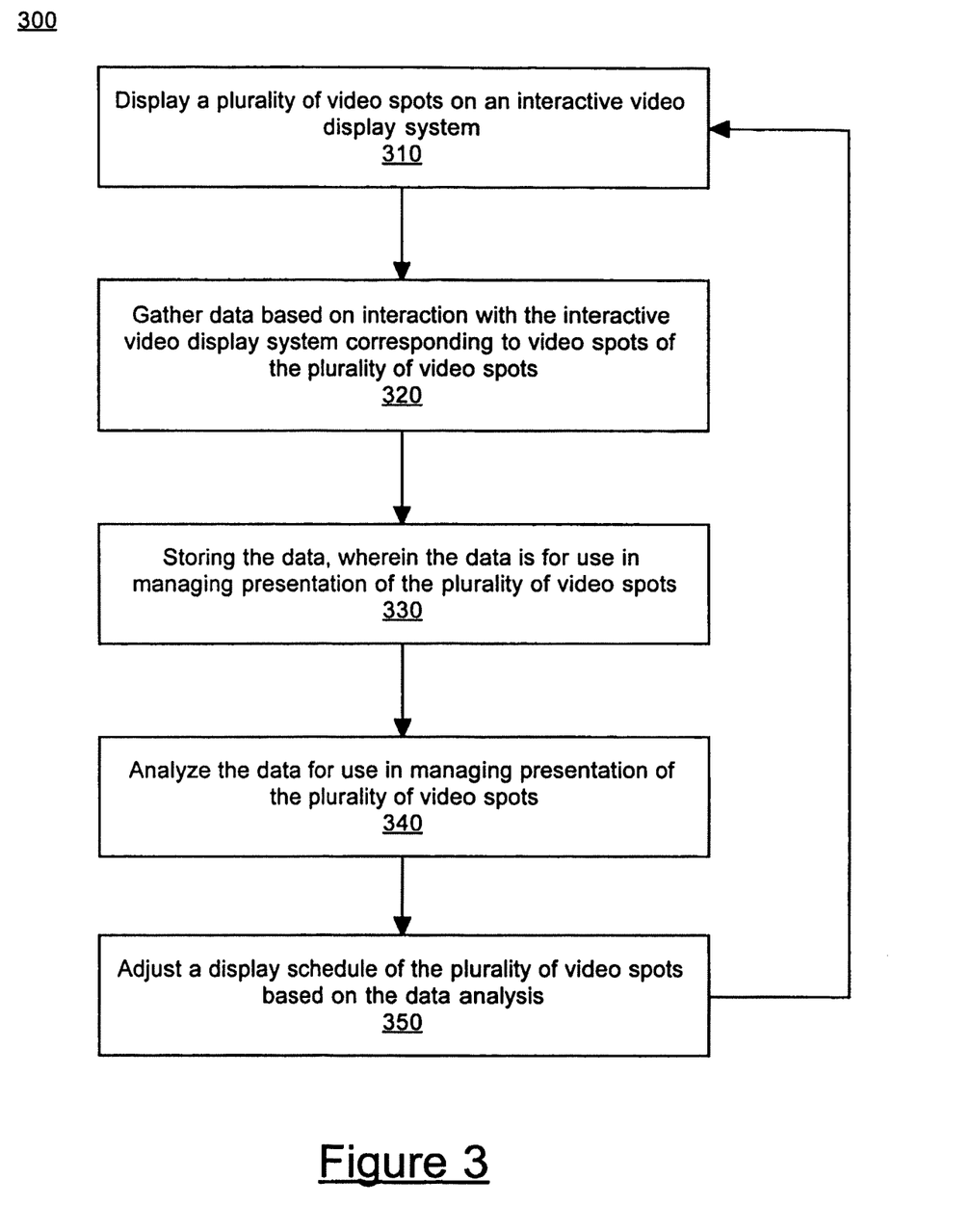
FIG. 3 illustrates a process for managing an interactive video display system in accordance with an embodiment of the present invention.

In one embodiment, as shown in FIG. 3, the present invention provides a process 300 for managing an interactive video display system, are described herein. In one embodiment, process 300 is carried out by processors and electrical components (e.g., an interactive video display system) under the control of computer readable and computer executable instructions, such as interactive video display system 210 of FIG. 2. Although specific steps are disclosed in process 300, such steps are exemplary. That is, the embodiments of the present invention are well suited to performing various other steps or variations of the steps recited in FIG. 3.

At step 310 of process 300, a plurality of video spots are displayed on the interactive video display system. In one embodiment, the plurality of video spots are displayed in a pseudo random order. In one embodiment, the length of time that a particular video spot is displayed is adjusted.

At step 320, data based on interaction with the interactive video display system corresponding to video spots of the plurality of video spots is gathered. In one embodiment, the interaction is determined according to person tracking. In another embodiment, the interaction is determined according to a foreground/background classification image.

At step 330, the data is stored, wherein the data is for use in managing presentation of the video spots. In one embodiment, the data is stored at a local memory of the interactive video display system. In another embodiment, the data is transmitted to an external computer system and is stored in a memory of the external computer system.

At step 340, in accordance with one embodiment, the data is analyzed for use in managing presentation of the plurality of video spots. In one embodiment, analyzing the data includes determining popularity for at least one video spot of the plurality of video spots based on the data. In another embodiment, analyzing the data includes determining a first user attraction level for at least one video spot of the plurality of video spots based on the data. In another embodiment, analyzing the data includes determining a group appeal for at least one video spot of the plurality of video spots based on the data. In one embodiment, external data is gathered for use in analyzing the data.

At step 350, in one embodiment, the display schedule of the plurality of video spots is adjusted based on analyzing data. In one embodiment, the display schedule is automatically adjusted based on the analysis. In another embodiment, the display schedule is manually adjusted based on the analysis. In one embodiment, the display schedule is fed into step 310 of process 300 for displaying the video spots.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

Various embodiments of the invention, a method and system for managing an interactive video display system, are thus described. While the present invention has been described in particular embodiments, it should be appreciated that the invention should not be construed as limited by such embodiments, but rather construed according to the below claims.

What is claimed is:

1. An interactive video system, comprising:
   a video display system comprising a projector configured to project an image on a portion of a display area, and a camera configured to capture an image of interactions with the projected image, the projected image comprising a first scheduled content selection;
   a first computing device configured to analyze the captured image of interactions with the projected image, and to determine information about position and movement of people or objects interacting with the projected image; and
   a second computing device configured to receive the determined information from the first computing device, to determine a popularity of the first scheduled content selection based at least in part on the information about the position and movement of people or objects interacting with the projected image, and to determine a schedule for subsequent display of the first scheduled content selection based at least in part on the determined popularity of the first scheduled content selection.

2. The interactive video system of claim 1, wherein the second computing device is further configured to generate a report.

3. The interactive video system of claim 2, wherein the report indicates the popularity of the first scheduled content selection.

4. The interactive video system of claim 2, wherein the report indicates the popularity of the first scheduled content selection with respect to another scheduled content selection.

5. The interactive video system of claim 2, wherein the report is generated in response to a query.

6. The interactive video system of claim 5, wherein the query is automated.

7. The interactive video system of claim 5, wherein the query is human generated.

8. The interactive video system of claim 1, wherein the projector is further configured to subsequently project the image comprising the first scheduled content selection according to the determined schedule.

9. The interactive video system of claim 1, wherein the first computing device is further configured to determine information about the position and movement of people or objects on another portion of the display area, and wherein the information about the position and movement of people or objects on the another portion of the display area is also analyzed by the second computing device to determine the popularity of the first scheduled content selection.

10. The interactive video system of claim 1, wherein determining the popularity of the first scheduled content selection includes comparing a number of interactions with the first scheduled content selection with a number of interactions with another scheduled content selection.

11. The interactive video system of claim 1, wherein determining the popularity of the first scheduled content selection includes comparing an amount of interaction with the first scheduled content selection with an amount of interaction with another scheduled content selection.

12. The interactive video system of claim 11, wherein the another scheduled content selection is displayed immediately prior to the subsequent display of the first scheduled content selection.

13. The interactive video system of claim 11, wherein the another scheduled content selection is displayed immediately after the subsequent display of the first scheduled content selection.

14. The interactive video system of claim 10, wherein the number of interactions with the first scheduled content selection and the another scheduled content selection is limited to a particular time period.

15. The interactive video system of claim 1, wherein determining the popularity of the first scheduled content selection includes comparing a number of interactions with a first portion of the first scheduled content selection with a second portion of the first scheduled content selection.

16. The interactive video system of claim 1, wherein determining the popularity of the first scheduled content selection includes determining a length of time a person or object interacts with the first scheduled content selection.

17. The interactive video system of claim 1, wherein determining the popularity of the first scheduled content selection includes identifying particular objects in the first scheduled content selection interacted with by a person or object.

18. The interactive video system of claim 1, wherein determining the popularity of the first scheduled content selection includes determining a number of interactions with a particular segment of the projected image.

19. The interactive video system of claim 1, wherein determining the popularity of the first scheduled content selection further includes the second computing device analyzing at least one external factor comprising time of day, day of week, season, and weather.

20. The interactive video system of claim 19, further comprising adjusting the display schedule based on one or more of the analyzed external factors.

21. The interactive video system of claim 19, further comprising adjusting the display scheduled based on one or more of the analyzed external factors and the popularity of the first scheduled content selection.

22. The interactive video system of claim 1, wherein determining the popularity of the first scheduled content selection further includes the second computing device analyzing at least one demographic related to a location of physical installation of the video display system, the demographic including gender.

23. The interactive video system of claim 1, wherein determining the popularity of the first scheduled content selection further includes the second computing device analyzing at least one demographic related to a location of physical installation of the video display system, the demographic including age.

24. The interactive video system of claim 1, wherein determining the popularity of the first scheduled content selection further includes the second computing device analyzing at least one demographic related to a location of physical installation of the video display system, the demographic including income.

25. The interactive video system of claim 1, the system further comprising:
a second video display system comprising:
a second projector configured to project a second image on a second portion of a second display area; and
a second camera configured to capture a second image of interactions with the second projected image, the second projected image comprising the first scheduled content selection;
wherein the first computing device is further configured to analyze the second captured image of interactions with the second projected image, and to determine information about position and movement of people or objects interacting with the second projected image;
wherein the second computing device is further configured to determine the popularity of the first scheduled content selection based on information about interactions with the projected image at the video display system and based on interactions with the second projected image at the second display system.

26. The interactive video system of claim 25, wherein the second projector at the second video display system is further configured to subsequently project the second image comprising the first scheduled content selection according to the determined schedule.

27. The interactive video system of claim 1, wherein determining the popularity of the first scheduled content selection includes determining an amount of movement by a person or object interaction with the first scheduled content selection.

28. A method of managing an interactive display system, the method comprising:
projecting an image onto a portion of a display area, the projected image corresponding to a first scheduled content selection;
capturing an image of an area on or near the display area;
determining, from the captured image, information about position and movement of people or objects interacting with the projected image;
determining a popularity of the first scheduled content selection based at least in part on the information about the position and movement of people or objects interacting with the projected image; and
determining a schedule for subsequent display of the first scheduled content selection based at least in part on the determined popularity of the first scheduled content selection.

29. The method of claim 28, wherein determining the popularity of the first scheduled content selection comprises determining a first user attraction level based at least in part on a number of occurrences where no person or object is interacting with the projected image at a beginning of the first scheduled content selection and at least one person or object is interacting with the projected image at an end of the first scheduled content selection.

30. The method of claim 29, wherein determining the schedule comprises scheduling a content selection with a high first user attraction level when no person or object is interacting with the projected image.

31. The method of claim 28, wherein determining the popularity of the first scheduled content selection comprises determining a group appeal level based at least in part on a number of occurrences where one person or object is interacting with the projected image at a beginning of a first scheduled content selection and a plurality of people or objects is interacting with the projected image at an end of the first scheduled content selection.

32. The method of claim 31, wherein determining a schedule comprises scheduling a content selection with a high group appeal level when one person or object is interacting with the projected image.

33. An article of manufacture including a computer-readable medium having instructions stored thereon that, in response to execution by a computing device, cause the computing device to:
project an image onto a portion of a display area, the projected image corresponds to a first scheduled content selection;
capture an image of an area on or near the display area;
determine, from the captured image, information about position and movement of people or objects interacting with the projected image;
determine a popularity of the first scheduled content selection based at least in part on the information about the position and movement of people or objects interacting with the projected image; and
determine a schedule for subsequent display of the first scheduled content selection based at least in part on the determined popularity of the first scheduled content selection.

* * * * *

UNITED STATES PATENT AND TRADEMARK OFFICE
CERTIFICATE OF CORRECTION

PATENT NO.         : 8,487,866 B2
APPLICATION NO.    : 12/417588
DATED              : July 16, 2013
INVENTOR(S)        : Bell et al.

It is certified that error appears in the above-identified patent and that said Letters Patent is hereby corrected as shown below:

On Title Page 3, Item (56), under "OTHER PUBLICATIONS", in Column 2, Lines 11-12, delete "<http://www.particles.de/paradocs/r111/10mikp2004/hmtl/r111_text111hock04.html>," and insert -- <http://www.particles.de/paradocs/r111/10mkp2004/hmtl/r111_text111hock04.html>, --, therefor.

On Title Page 4, Item (56), under "OTHER PUBLICATIONS", in Column 1, Line 61, delete "Mar. 16, 200." and insert -- Mar. 16, 2007. --, therefor.

On Title Page 4, Item (56), under "OTHER PUBLICATIONS", in Column 2, Line 11, delete "al," and insert -- al., --, therefor.

On Title Page 4, Item (56), under "OTHER PUBLICATIONS", in Column 2, Line 67, delete "Skovde," and insert -- Skövde, --, therefor.

On Title Page 5, Item (56), under "OTHER PUBLICATIONS", in Column 2, Line 10, delete "Electonica" and insert -- Electronica --, therefor.

On Title Page 5, Item (56), under "OTHER PUBLICATIONS", in Column 2, Line 36, delete "al.;" and insert -- al., --, therefor.

On Title Page 6, Item (56), under "OTHER PUBLICATIONS", in Column 1, Line 39, delete ""Plasma/Architexture,"" and insert -- "Plasma/Architecture," --, therefor.

On Title Page 6, Item (56), under "OTHER PUBLICATIONS", in Column 2, Line 27, delete "al;" and insert -- al., --, therefor.

On Title Page 6, Item (56), under "OTHER PUBLICATIONS", in Column 2, Lines 31-33, delete "http://groups.csail.mit.edu/graphics/ciasses/6,837/F99/projects/reports/team16.pdf." and insert -- http://groups.csail.mit.edu/graphics/classes/6.837/F99/projects/reports/team16.pdf. --, therefor.

Signed and Sealed this
Eighteenth Day of March, 2014

Michelle K. Lee
*Deputy Director of the United States Patent and Trademark Office*

CERTIFICATE OF CORRECTION (continued)
U.S. Pat. No. 8,487,866 B2

In the Specification

In Column 6, Line 34, delete "analysis" and insert -- analysis. --, therefor.